United States Patent [19]

Saxton

[11] 4,169,561
[45] Oct. 2, 1979

[54] LAWN MOWER CHOPPING ATTACHMENT

[76] Inventor: Wilbur L. Saxton, 22808 66th Ave. West, Mountlake Terrace, Wash. 98043

[21] Appl. No.: 540,656

[22] Filed: Jan. 13, 1975

[51] Int. Cl.$^2$ .................... B02C 18/10; B02C 18/22
[52] U.S. Cl. ................... 241/101.1; 241/101.7; 241/222
[58] Field of Search ............... 241/101.1, 101.2, 101.7, 241/188 R, 189 R, 190, 222; 56/13.3, 13.4, 16.9, 17.5

[56] References Cited

U.S. PATENT DOCUMENTS

| 2,809,389 | 10/1957 | Collins et al. ............... 241/101.7 X |
| 3,240,247 | 3/1966 | Lautzenheiser ................. 241/190 X |
| 3,286,376 | 11/1966 | Wildes ........................... 56/16.9 X |
| 3,527,278 | 9/1970 | Johnson, Jr. .................. 241/101.2 X |
| 3,716,089 | 2/1973 | Bateman ....................... 241/189 R X |
| 3,716,090 | 2/1973 | Lautzenheiser ................ 241/101.7 |
| 3,908,913 | 9/1975 | Cushman ......................... 241/101.7 |

Primary Examiner—Howard N. Goldberg
Attorney, Agent, or Firm—Seed, Berry, Vernon & Baynham

[57] ABSTRACT

A platform is inclined relative to the ground to support and close the open housing of a rotary lawn mower. A feed inlet is provided in the platform with a guide chute for directing twigs and lawn clippings upwardly into the housing. A shear bar is provided for coacting with the rotary mower blade to chop the materials inserted. Adjustable wheel mounts and housing closure aprons are provided to adjust the platform for various sized lawn mowers.

10 Claims, 4 Drawing Figures

LAWN MOWER CHOPPING ATTACHMENT

BACKGROUND OF THE INVENTION

1. Field of the Invention

This invention pertains to attachments for use with rotary lawn mowers to convert the mowers into chopping devices suitable for chopping leaves, twigs and small branches.

2. Description of the Prior Art

Various types of attachments are known for attempting to convert a rotary lawn mower to a chopping or mulching device. Some of these devices are illustrated in U.S. Pat. Nos. 3,527,278, 2,706,372, 3,790,094; 3,286,376 and 3,808,782. None of these devices are satisfactory since it is believed that they do not provide sufficient high-torque shearing action nor adequate residence time of the material in the housing for effective chopping. For example, U.S. Pat. No. 3,808,782 discloses an attachment removably mounted on the upper portion of a mower housing. Materials inserted through the chute 28 are cut solely by the rotary blade, which is generally ineffective to chop larger (up to ¾ inch in diameter) twigs. Furthermore, the bottom of the housing opening is left open so that some of the materials will be immediately ejected without sufficient residence time for complete chopping.

SUMMARY OF THE INVENTION

It is an object of this invention to provide an attachment for a rotary lawn mower which provides effective cutting action with sufficient residence time to enable the chopping of leaves and small diameter twigs and branches.

It is another object of this invention to provide a chopping attachment for a rotary lawn mower which is inexpensive to manufacture and maintain.

It is still another object of this invention to provide a chopping attachment for a rotary lawn mower which is easy to feed and adaptable for most any normal size rotary lawn mower.

Basically, these objects are obtained by providing a platform suitable to close the open bottom of a rotary lawn mower housing, means for supporting the housing on an angle, feed inlet means for feeding material to be chopped in through the platform into the housing near the periphery of the housing, and a chopping bar positioned on the platform in close proximity to the cutting plane of the rotary blade for shearing the materials fed thrugh the feed inlet. Discharge of the chopped materials is directed out through the normal discharge opening of the housing and can be captured, if desired, in a lawn clipping bag. A chute is provided for guiding the materials in through the feed opening and facilitating the feeding through the feed inlet. In the preferred form of the invention, a suitable adjustable or replaceable apron and adjustable wheel stops are provide for adapting the platform to various size lawn mower housings. Although the preferred embodiment of the invention shows the platform inclined so that the mower is tilted sideways, the platform can also be arranged so that the mower is inclined front-to-back or vice versa.

DETAILED DESCRIPTION OF THE PREFERRED EMBODIMENTS

Figure 1:
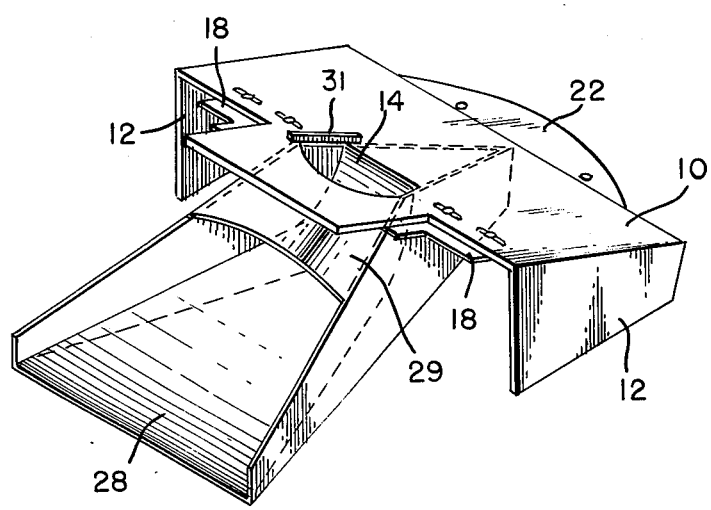
FIG. 1 is an isometric illustration of the preferred embodiment of the lawn mower chopping attachment.

As best shown in FIG. 1, the rotary lawn mower chopping attachment includes a planar platform 10 supported on an angle relative to the ground by end walls 12. The platform has a feed inlet 14 positioned generally adjacent the periphery 15a of a rotary lawn mower housing 15. The feed inlet, however, can be positioned radially inward from the periphery, if desired, and, of course, will vary in its position relative to the periphery depending upon the size of the lawn mower housing on the platform.

The platform corners are cut out as at 16 for receiving the wheels 17 of the lawn mower. Adjustable wheel stops 18, each having a solid plate 18a and two sets of adjustment screws 18b, are provided in the cut-outs 16. The adjustment screws 18b ride in longitudinal slots 19 in the platform and in transverse slots 20 in the plates 18a. In this manner, the plates can be moved longitudinally and transversely of the platform, such as into the solid-line position shown in FIG. 2, for abutting against the wheels of larger lawn mowers. In addition to serving as abutments or wheel stops, the plate 18a also serve to enclose the edges of the lawn mower housing adjacent the wheels.

Figure 2:
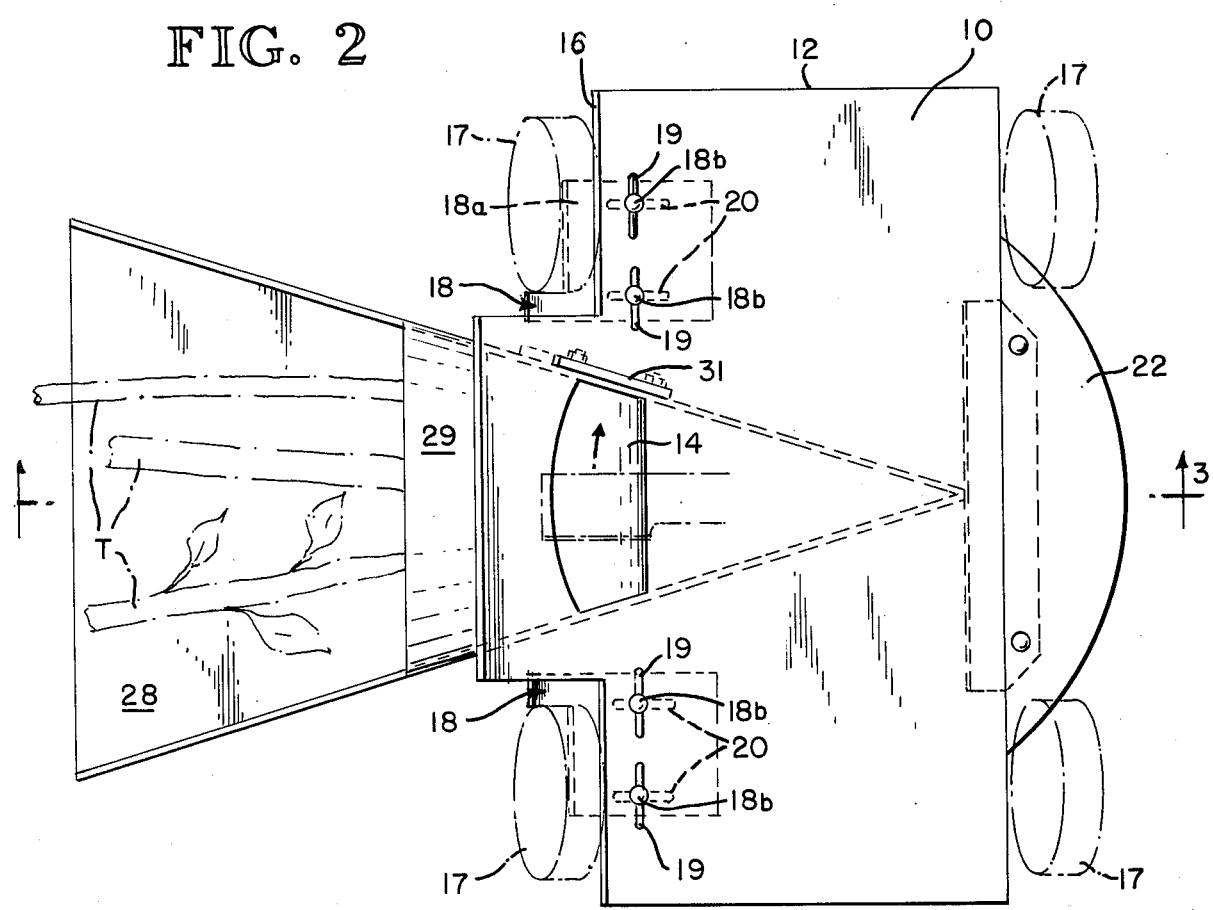
FIG. 2 is a plan of FIG. 1 showing a typical lawn mower in phantom lines positioned on the attachment.

The platform is also provided with a removable apron 22. Several aprons 22 of various sizes can be detachably mounted to the platform, as illustrated in FIG. 2, or the apron can be adjustable to slidably extend the surface of the platform for larger mower housings.

Figure 3:
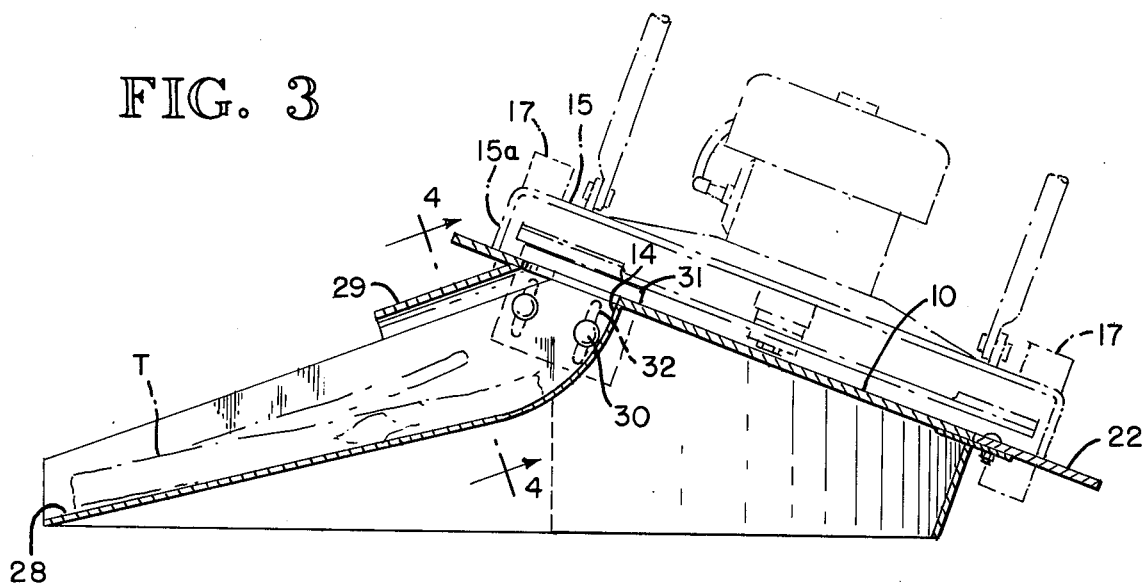
FIG. 3 is a vertical section taken along the line 3-3 of FIG. 2.
Figure 4:
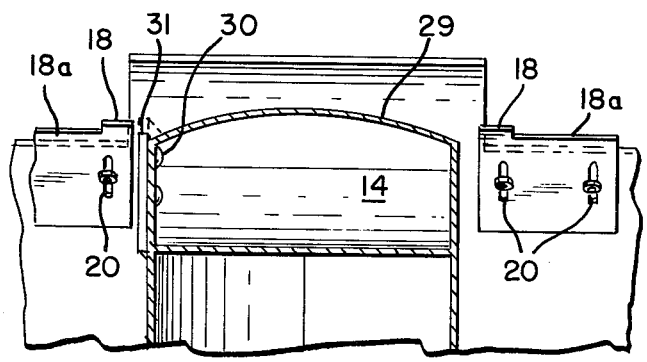
FIG. 4 is a fragmentary section taken along the line 4—4 of FIG. 3.

In order to facilitate the feeding of material, such as twigs T (FIG. 3), into the feed inlet 14, the attachment is provided with a curved chute 28 having a partial top cover 29. As is readily understood, the top cover 29 is preferably curved to match with the elliptical projection of the feed inlet 14 to provide a smooth transition between the chute and the platform.

A shearing bar 31 is vertically adjustably secured to the chute 28 by bolts 30 which ride in slots 32 in the shear bar. The slots provide vertical positioning of the shear bar 31 so that it can be positioned close to the cutting plane of the rotary blade of various sized mowers. Preferably the bar 31 is positioned closely adjacent and downstream of the feed inlet in the direction of rotation of the rotary blade. As is readily apparent, the shear bar will provide a scissor or shearing action which is significantly more effective in cutting twigs and small branches than the mere slicing action of the rotary blade alone.

In operation, a suitable rotary lawn mower is positioned on the platform with a correspondingly sized apron 22 and corresponding adjustment of the wheel abutments 18 to close off the housing and position the wheels of the mower so that the cutting edge of the mower blade is positioned over the cutting bar 31 on the platform. That is, the wheel stops 18 not only hold the mower from sliding on the platform but also position the cutting edge of the blade in a desired position relative to the cutting bar and the feed inlet 14. Next, the mower is energized and the materials to be chopped are slid in through the feed inlet along the chute 28. Since the discharge of the clippings will be through the normal discharge opening of the housing, the workman is not exposed to the rapidly rotating blade during the feeding process. That is, the only access to the rotating blade is through the feed inlet and since the curvature of the chute facilitates movement of the materials through the feed inlet, the operator can keep his hands at a safe distance from the feed inlet during the pushing of materials into the housing. When the chopping task is completed, it is, of course, very easy to remove the mower and store the attachment for future use.

While the preferred embodiments of the invention have been illustrated and described, it should be understood that variations will be apparent to one skilled in the art without departing from the principles herein. For example, positioning and retention of the mower housing on the platform can be accomplished by upstanding pins on the higher end of the platform engageable with the inside periphery of the mower housing, rather than to use the wheel stops as illustrated. Accordingly, the invention is not to be limited to the specific embodiments illustrated.

The embodiments of the invention in which a particular property or privilege is claimed are defined as follows:

1. An attachment for a rotary lawn mower having a powered rotary blade, a housing having an open bottom surrounding said rotary blade and a discharge outlet, and a plurality of ground engaging wheels carried on said housing, the improvement comprising a detachable planar platform having an upper surface for closing said housing bottom, means supporting said platform on an angle to the horizontal and vertically off the ground a distance sufficient to raise the lawn mower wheels off the ground and cause the housing to rest snuggly on the platform closing the bottom of the housing, a feed inlet in said platform adjacent and within the periphery of said housing, means for guiding articles to be chopped in through said feed inlet, and a bar fixed to the upper surface of said platform adjacent the feed inlet and positioned a slight distance below the plane of rotation of the rotary blade for shearing the articles between the blade and the bar whereby the attachment enables the lawn mower to be utilized to chop large articles, such as leaves, twigs, and small branches, and discharge the chopped articles through the mower housing discharge outlet.

2. The attachment of claim 1, said guiding means including a chute extending downwardly and laterally from the feed inlet.

3. The attachment of claim 1, said platform having adjustable wheel stops extendable in the plane of the platform in two directions for abutting against the wheels of various size mowers.

4. The attachment of claim 3, including a replaceable apron for enlarging the platform to enclose larger housings of various size mowers.

5. The attachment of claim 1, said platform having a replaceable apron for enlarging the platform to enclose larger housings of various size mowers.

6. The attachment of claim 1, said means for supporting said platform including vertical end walls lying fore and aft of said mower housing, said end walls each having aligned lower and higher ends for positioning the platform in an inclined plane rotated about the longitudinal axis of the platform whereby the mower is tilted sidewise for feeding material into the feed inlet from the side of the mower.

7. An attachment for a rotary lawn mower having a powered rotary blade, a housing having an open bottom surrounding said rotary blade and a discharge outlet, and a plurality of ground engaging wheels carried on said housing, the improvement comprising a planar platform having an upper surface adapted for closing said housing bottom, means supporting said platform on an angle to the horizontal and vertically off the ground a distance sufficient to be adapted to raise the lawn mower wheels off the ground and to adapt the housing to rest snuggly on the platform, a feed inlet in said platform adapted to be adjacent the periphery of said housing, means for guiding articles to be chopped in through said feed inlet, and a bar fixed to the upper surface of said housing adjacent the feed inlet and adapted to be positioned a slight distance below the plane of rotation of the rotary blade for shearing the articles between the blade and the bar whereby the attachment is adapted to enable the lawn mower to be utilized to chop large articles, such as leaves, twigs, and small branches, and discharge the chopped articles through the mower housing discharge outlet, said platform having adjustable wheel stops extendable in the plane of the platform in two directions for abutting against the wheels of various size mowers.

8. The attachment of claim 7, including a replaceable apron for englarging the platform to enclose larger housings of various size mowers.

9. An attachment for rotary lawn mower having a powered rotary blade, a housing having an open bottom surrounding said rotary blade and a discharge outlet, and a plurality of ground engaging wheels carried on said housing, the improvement comprising a planar platform having an upper surface adapted for closing said housing bottom, means supporting said platform on an angle to the horizontal and vertically off the ground a distance sufficient to be adapted to raise the lawn mower wheels off the ground and to adapt the housing to rest snuggly on the platform, a feed inlet in said platform adapted to be adjacent the periphery of said housing, means for guiding articles to be chopped in through said feed inlet, and a bar fixed to the upper surface of said housing adjacent the feed inlet and adapted to be positioned a slight distance below the plane of rotation of the rotary blade for shearing the articles between the blade and the bar whereby the attachment is adapted to enable the lawn mower to be utilized to chop large articles, such as leaves, twigs, and small branches, and discharge the chopped articles through the mower housing discharge outlet, said means for supporting said platform including vertical end walls lying fore and aft of said mower housing, said end walls each having aligned lower and higher ends for positioning the platform in an inclined plane rotated about the longitudinal axis of the platform whereby the mower is tilted sidewise for feeding material into the feed inlet from the side of the mower.

10. An attachment for a rotary lawn mower having a powered rotary blade, a housing having an open bottom surrounding said rotary blade and a discharge outlet, and a plurality of ground engaging wheels carried on said housing, the improvement comprising a detachable planar platform having an upper surface for closing said housing bottom, means supporting said platform on an angle to the horizontal and vertically off the ground a distance sufficient to raise the lawn mower wheels off the ground and cause the housing to rest snuggly on the platform closing the bottom of the housing, a feed inlet in said platform adjacent and within the periphery of said housing, means for guiding articles to be chopped in through said feed inlet, and means on the upper surface of said platform adjacent the feed inlet and positioned a slight distance below the plane of rotation of rotary blade for shearing the articles between the blade and said means, whereby the attachment enables the lawn mower to be utilized to chop large articles, such as leaves, twigs, and small branches, and discharge the chopped articles through the mower housing discharge outlet.

* * * * *